United States Patent [19]

Miller et al.

[11] 3,835,784

[45] Sept. 17, 1974

[54] MINE FUZE

[75] Inventors: Harold C. Miller; Wilbert W. Cranford, Jr., both of Chicago; James J. Brophy, Western Springs, all of Ill.

[73] Assignee: The United States of America as represented by the Secretary of the Army, Washington, D.C.

[22] Filed: July 23, 1956

[21] Appl. No.: 599,664

[52] U.S. Cl. .............. 102/70.2 R, 102/18, 102/19.2
[51] Int. Cl. ...................... F42c 15/14, F42b 23/26
[58] Field of Search ................ 102/8, 18, 70.2, 19.2

[56] References Cited
FOREIGN PATENTS OR APPLICATIONS
119,191   7/1948   Australia............................. 102/70.2

OTHER PUBLICATIONS
"Journal of the Institute of Electrical Engineers," Nov. 1947, "Developments on Magnetic and Acoustic Mines at the Admirality Mining Establishment;" Baggott, pp. 509–526.

*Primary Examiner*—Benjamin A. Borchelt
*Assistant Examiner*—C. T. Jordan
*Attorney, Agent, or Firm*—Edward J. Kelly; Herbert Berl; Saul Elbaum

EXEMPLARY CLAIM

1. An anti-tank mine fuze comprising in combination: a capacitor; means responsive to vibration for applying electrical energy to the capacitor; a detonator; and means responsive to a changing magnetic field for connecting the capacitor to the detonator, said means responsive to a changing magnetic field including a frame, a rotor mounted for rotation about its axis on the frame, the rotor having a magnet and a commutator, and a brush mounted on the frame in electrical contact with the commutator.

2 Claims, 5 Drawing Figures

PATENTED SEP 17 1974 3,835,784

INVENTOR
Harold C. MILLER
Wilbert W. Cranford, Jr.
James J. Brophy
BY
W.E. Thibodeau, A.W. Pew & J.P. Edgerton
ATTORNEYS.

MINE FUZE

This invention relates to mine fuzes and more particularly to fuzes for anti-tank mines sensitive to a combination of vibration and magnetic signatures.

Moving tanks or other armored vehicles have several phenomena, herein called signatures, associated with them — e.g., weight, vibration, and magnetic field. Any one or combination of these signatures can be used to activate mine fuzes. There is an advantage of using multiple signatures because the chances of accidental activation is greatly reduced. For example, if the fuze is activated only by a combination of vibration and a changing magnetic field signatures, the mine is safe in the presence of any single signature.

Previous mine fuze designs have recognized the desirability of utilizing a magnetic signature but complex design was necessary because the variation of the earth's magnetic field made them difficult to set.

This invention utilizes a combination of vibration and magnetic signatures in such a manner that a simple design is possible. In it a vibration signature is utilized to arm the fuze by electrically charging a capacitor and a magnetic signature is utilized to operate a switch which connects the charged capacitor to a detonator. The electrical circuits are such that the magnetic controlled switch need not be preset to any particular position — i.e., the operation of the fuze is not affected by the random position of the magnet as determined by the earth's field.

An object of this invention is to provide a fuze sensitive to proximate movement of a tank.

Another object is to provide a magnetic sensitive fuze which need not be preset to the earth's magnetic field.

A further object is to provide a fuze utilizing a combination of vibration and magnetic signatures.

Still further objects are to achieve the above with a device that is sturdy, simple, and reliable, yet cheap and easy to manufacture.

The specific nature of the invention as well as other objects, uses and advantages thereof will clearly appear from the following description and from the accompanying drawing, in which.

Figure 1:
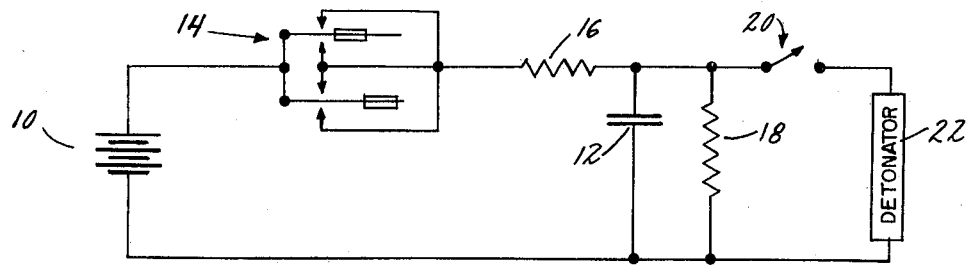
FIG. 1 is a schematic diagram of a fuze circuit in accordance with this invention.

As seen in FIG. 1 a source of electrical energy such as a battery 10 is connected to a capacitor 12 through vibration reeds 14 and resistor 16. The capacitor 12 is shunted by a resistor 18 and connected by magnetic switch unit 20 to detonator 22.

When a tank approaches, the vibration signature causes reeds 14 to close the circuit between the battery 10 and the capacitor 12. Such reeds are known to the art. Should the switch 20 be closed, the current will be limited by resistor 16 (which may be about 100,000 ohms) to a value which will not activate the detonator 22. If the switch 20 is open or subsequently opens the capacitor 12 (about 0.05 microfarads) charges. As the resistor 18 is large (about 5 megohms) the charge will not quickly leak off. Then the closing of switch 20 will connect the charged capacitor 12 to the detonator 22 thereby activating it if vibration has recently occurred. If a magnetic signature is not received within a few seconds of a vibration signature the charge on capacitor 12 will leak off through resistor 18.

Figure 2:
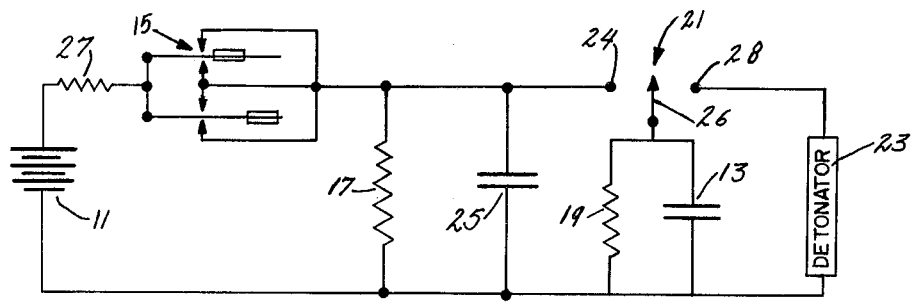
FIG. 2 is a schematic diagram of a modification of the circuit shown in FIG. 1.

A modification illustrated in FIG. 2 avoids any current except the final signal passing through the detonator by use of a single-pole double-throw magnetic switch. Battery 11 is connected through reeds 15 to capacitor 25 shunted by resistor 17. Capacitor 25 is also connected to contact 24 of magnetic switch unit 21. The moving element 26 of this switch is connected to capacitor 13 which is shunted by resistor 19. Another contact 28 of the switch unit is connected to detonator 23. As a tank approaches the vibration signature causes reeds 15 to connect the battery 11 to capacitor 25 charging it. A changing magnetic field will cause moving element 26 to move between contacts 24 and 28 as will be explained later. As element 26 moves to contact 24 the capacitor 13 will be charged from capacitor 25. Then as element 26 moves to contact 28 the capacitor 13 will discharge through detonator 23. Resistor 27 is to prevent the reeds 15 from arcing.

From the above it will be evident that the circuits provide a fuze utilizing a magnetic controlled switch, which may be in any position originally, provided that the action of the switch in response to a tank includes a motion from open to closed position (FIG. 1) or a motion of arm 26 from contact 24 to contact 28 (FIG. 2).

Figure 3:
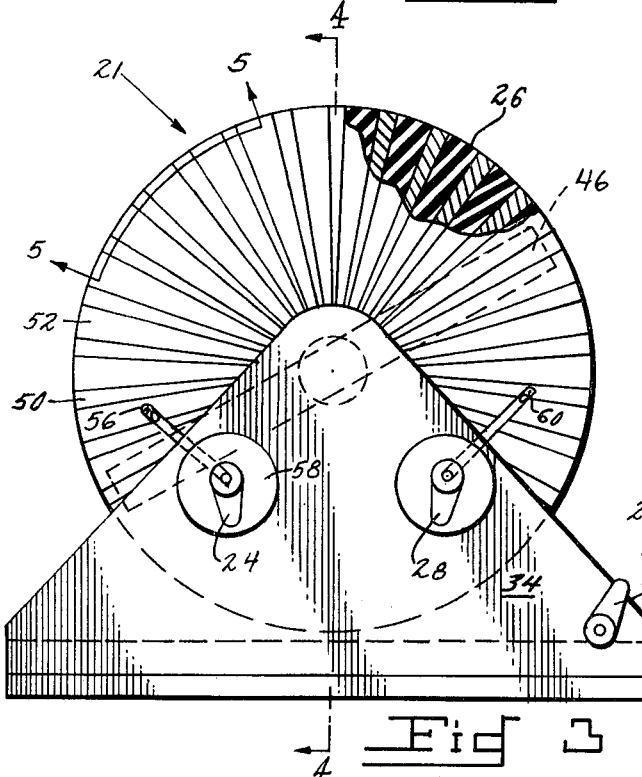
FIG. 3 is an elevational view of a magnetic switch in accordance with the invention.
Figure 4:
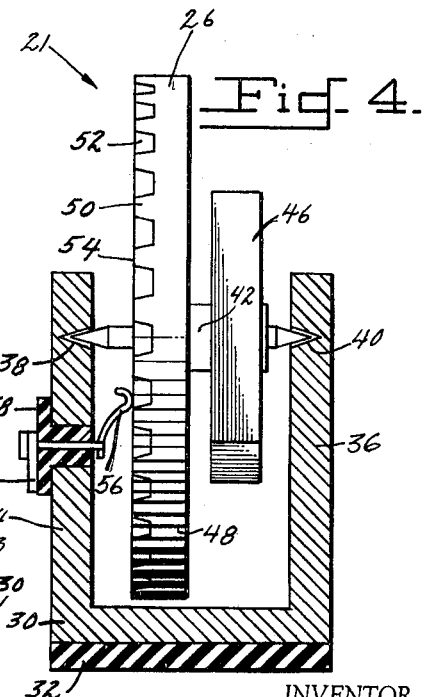
FIG. 4 is a sectional view of the switch taken on lines 4—4 of FIG. 3.
Figure 5:
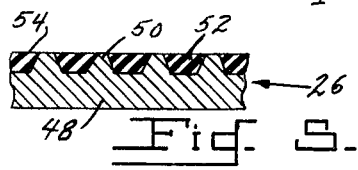
FIG. 5 is a sectional view of a commutator of the switch taken along lines 5—5 of FIG. 3.

FIGS. 3, 4 and 5 show an embodiment of switch 21. It is also adapted for use as switch 20. Frame 30 is electrically insulated from its mounting by block 32. The frame 30 is made of a nonmagnetic electrically conductive material and has lug 33 for one electrical connection. The frame 30 includes two uprights 34 and 36 which have journals 38 and 40. Pivoted in these journals is a rotor 42 which has a moving element or commutator 26 and a bar magnet 46. The commutator 26 comprises a disc 48 of electrically conductive nonmagnetic material with one flat face having a number—30, for example—of equally spaced radial bosses 50. The area between the bosses is filled with an insulating material 52 and the face 54 is finished smooth, as by lapping. The insulating segments are preferably considerably wider than the bosses.

Brush 56, electrically connected to contact 24, is a bent wire making point contact with face 54. Brush 56 is attached to frame 34 through an insulating grommet 58. Brush 60, electrically connected to contact 28, is mounted in the same manner as brush 56. The two brushes are spaced so that when one is making contact at the center of a boss 50 the other rests on the insulating material 52 half way between adjacent bosses. It can be seen that when the rotor 42 is rotated in response to a magnetic signature, contacts 24 and 28 will alternately be connected to moving element 26. Thus the switch meets the requirements of the circuit shown in FIG. 2.

To be used as switch 20 in the circuit of FIG. 1 only one contact need be connected. Otherwise no change is necessary.

It will be apparent that the embodiments shown are only exemplary and that various modifications can be made in construction, materials, and arrangement within the scope of the invention as defined in the appended claims.

We claim:

1. An anti-tank mine fuze comprising in combination: a capacitor; means responsive to vibration for applying electrical energy to the capacitor; a detonator; and means responsive to a changing magnetic field for connecting the capacitor to the detonator, said means responsive to a changing magnetic field including a frame, a rotor mounted for rotation about its axis on the frame, the rotor having a magnet and a commutator, and a brush mounted on the frame in electrical contact with the commutator.

2. The invention as defined in claim 1, including: a second brush on said frame in contact with said commutator; and wherein said means responsive to vibration is connected to the first-mentioned brush, said capacitor is connected to said commutator, and said detonator is connected to said second brush.

* * * * *